(12) United States Patent
Bao et al.

(10) Patent No.: US 10,322,436 B2
(45) Date of Patent: Jun. 18, 2019

(54) METHOD OF COATING INTERIOR SURFACES WITH RIBLETS

(71) Applicant: Nano and Advanced Materials Institute Limited, Hong Kong (HK)

(72) Inventors: Su Ping Bao, Hong Kong (HK); Lei Gao, Hong Kong (HK); Man Lung Sham, Hong Kong (HK); Chun Ping Wu, Hong Kong (HK); Chi Wai Li, Hong Kong (HK)

(73) Assignee: NANO AND ADVANCED MATERIALS INSTITUTE LIMITED, Hong Kong (HK)

( * ) Notice: Subject to any disclaimer, the term of this patent is extended or adjusted under 35 U.S.C. 154(b) by 42 days.

(21) Appl. No.: 15/726,403

(22) Filed: Oct. 6, 2017

(65) Prior Publication Data

US 2018/0099312 A1 Apr. 12, 2018

Related U.S. Application Data

(60) Provisional application No. 62/496,121, filed on Oct. 6, 2016.

(51) Int. Cl.
| | | |
|---|---|---|
| *B05D 7/22* | (2006.01) |
| *B05D 1/02* | (2006.01) |
| *F15D 1/06* | (2006.01) |
| *F15D 1/00* | (2006.01) |
| *B05D 1/30* | (2006.01) |
| *B05D 1/42* | (2006.01) |
| *F16L 55/165* | (2006.01) |
| *B05D 5/02* | (2006.01) |

(52) U.S. Cl.
CPC ............ *B05D 7/222* (2013.01); *B05D 1/02* (2013.01); *B05D 1/30* (2013.01); *B05D 1/42* (2013.01); *F15D 1/0035* (2013.01); *F15D 1/0085* (2013.01); *F15D 1/065* (2013.01); *B05D 5/02* (2013.01); *F15D 1/004* (2013.01); *F15D 1/06* (2013.01); *F16L 55/1654* (2013.01)

(58) Field of Classification Search
None
See application file for complete search history.

(56) References Cited

U.S. PATENT DOCUMENTS

| | | |
|---|---|---|
| 4,009,063 A | 2/1977 | Wood |
| 4,088,622 A | 5/1978 | Pearl |
| 4,135,958 A | 1/1979 | Wood |
| 4,680,066 A | 7/1987 | Wood |
| 4,706,910 A | 11/1987 | Walsh et al. |

(Continued)

*Primary Examiner* — Shamim Ahmed
*Assistant Examiner* — Bradford M Gates
(74) *Attorney, Agent, or Firm* — Idea Intellectual Limited; Margaret A. Burke; Sam T. Yip

(57) ABSTRACT

A method of applying a riblet structure coating on the internal surface of a pipe includes coating the internal surface of a pipe with a resin layer and applying a cavity mold having a reverse riblet pattern structure to the coated internal surface of the pipe. A flexible air bag is inserted into the interior of the pipe and charged with air to hold the mold against the coated internal surface of the pipe. The air bag may be charged with air for a sufficient amount of time to allow the coating to cure in the riblet shape of the mold. Afterwards, the air bag and the mold are removed from the pipe to yield a pipe coated with an internal riblet structure.

13 Claims, 10 Drawing Sheets

(56) References Cited

U.S. PATENT DOCUMENTS

| | | | |
|---|---|---|---|
| 4,750,693 A | 6/1988 | Lobert et al. | |
| 4,907,765 A | 3/1990 | Hirschel et al. | |
| 4,943,476 A | 7/1990 | Sokaris | |
| 4,986,496 A | 1/1991 | Marentic et al. | |
| 5,069,403 A | 12/1991 | Marentic et al. | |
| 5,133,516 A | 7/1992 | Marentic et al. | |
| 5,133,519 A | 7/1992 | Falco | |
| 5,386,955 A | 2/1995 | Savill | |
| 5,488,076 A | 1/1996 | Supcoe et al. | |
| 5,848,769 A | 12/1998 | Fronek et al. | |
| 5,937,910 A | 8/1999 | Chandler | |
| 6,193,191 B1 * | 2/2001 | Falcimaigne | B64C 21/10 138/37 |
| 6,345,791 B1 | 2/2002 | McClure | |
| 6,416,692 B1 | 7/2002 | Iwasaki-Higbee | |
| 6,666,646 B1 | 12/2003 | Van Ierland et al. | |
| 7,070,850 B2 | 7/2006 | Dietz et al. | |
| 7,448,413 B2 | 11/2008 | Kiest, Jr. | |
| 7,766,048 B2 | 8/2010 | Driver et al. | |
| 7,896,032 B2 | 3/2011 | Kiest, Jr. | |
| 8,047,238 B2 | 11/2011 | Wiessner et al. | |
| 8,113,469 B2 | 2/2012 | Lang | |
| 8,220,754 B2 | 7/2012 | McClure et al. | |
| 8,258,206 B2 | 9/2012 | Kangasabapathy et al. | |
| 8,413,928 B2 | 4/2013 | Rawlings et al. | |
| 8,444,092 B2 | 5/2013 | Li et al. | |
| 8,460,779 B2 | 6/2013 | Gupta et al. | |
| 8,524,320 B1 | 9/2013 | Gillanders et al. | |
| 8,636,869 B2 | 1/2014 | Wiessner et al. | |
| 8,668,166 B2 | 3/2014 | Rawlings et al. | |
| 8,678,316 B2 | 3/2014 | Rawlings et al. | |
| 8,684,310 B2 | 4/2014 | Rawlings et al. | |
| 8,794,574 B2 | 8/2014 | Lang | |
| 8,899,318 B1 | 12/2014 | Parsons | |
| 9,074,718 B2 | 7/2015 | Kiest, Jr. | |
| 9,151,415 B2 | 10/2015 | Zazovsky et al. | |
| 9,188,287 B2 | 11/2015 | Krautschick et al. | |
| 9,222,611 B2 | 12/2015 | Colasanto | |
| 9,272,791 B2 | 3/2016 | Brennan et al. | |
| 9,297,394 B2 | 3/2016 | Li et al. | |
| 2006/0251859 A1 | 11/2006 | D'Urso | |
| 2008/0257187 A1 * | 10/2008 | Millward | B82Y 10/00 101/452 |
| 2009/0267248 A1 * | 10/2009 | Yu | B29C 33/3857 264/1.38 |
| 2010/0270710 A1 * | 10/2010 | Kang | G11B 5/855 264/427 |
| 2010/0282909 A1 | 11/2010 | Rawlings et al. | |
| 2010/0330340 A1 | 12/2010 | Rothstein et al. | |
| 2011/0186685 A1 | 8/2011 | Tsotsis et al. | |
| 2012/0025025 A1 * | 2/2012 | Brennan | B64D 39/04 244/135 A |
| 2012/0202009 A1 | 8/2012 | Motofuji et al. | |
| 2013/0062004 A1 | 3/2013 | Amirehteshami et al. | |
| 2013/0146217 A1 | 6/2013 | Kray et al. | |
| 2013/0156595 A1 | 6/2013 | Sander et al. | |
| 2013/0295327 A1 | 11/2013 | Zhang et al. | |
| 2014/0110263 A1 | 4/2014 | Barbier et al. | |
| 2014/0130318 A1 | 5/2014 | Rohr et al. | |
| 2014/0147629 A1 | 5/2014 | Tanaka et al. | |
| 2014/0272237 A1 | 9/2014 | Roper et al. | |
| 2014/0356219 A1 | 12/2014 | Gammel et al. | |
| 2015/0053289 A1 | 2/2015 | Kurtovic et al. | |

\* cited by examiner

METHOD OF COATING INTERIOR SURFACES WITH RIBLETS

CROSS-REFERENCE TO RELATED APPLICATIONS

The present application is a non-provisional application and claims priority of the U.S. provisional patent application Ser. No. 62/496,121 filed Oct. 6, 2016, and the disclosure of which is incorporated herein by reference in its entirety.

FIELD OF THE INVENTION

The invention relates to coating interior surfaces and, more particularly, to coating the interior surfaces of pipes or other tubular structures with riblets to improve flow by reducing drag.

BACKGROUND

Riblets are typically small surface protrusions, optionally aligned with a direction of fluid flow, which confer an anisotropic roughness to a surface. In the present application, the term "riblet" is broadly applied and does not connote any particular pattern or structure. That is, the riblets of the present invention may have any pattern or texture that confers roughness to a surface and facilitate the flow of fluid along that surface.

Riblet-enhanced surfaces can be used in a wide variety of applications such as airplanes, trains, missiles, and blades since riblet-enhanced surfaces can reduce the turbulent skin friction, particularly when aligned in a stream-wise direction.

In recent years, several manufacturing techniques have been applied to create the riblet structure such as grooving, molding, grinding, laser-beam-removing, lacquering and rolling.

U.S. Pat. No. 9,272,791 discloses a pipe for an aircraft refueling system. The pipe has an inner surface including a riblet texture. In this case the surface texture was formed from a layer of conductive material in the form of foil. The riblet structure on the surface of foil was produced by embossing. Then the inner surface was generated by wrapping a tape around the riblet foil. The riblet foil has a series of triangular grooves in which the height of riblets may be between 0.5 mm and 1.5 mm, and the spacing between riblets is between 0.75 mm and 2.25 mm. The riblet pattern can give rise to a drag reduction up to 12% due to a reduction in cross-flow turbulence intensity.

U.S. Pat. No. 9,151,415 discloses a pipe for transporting a multiphase oil/water mixture. The tubular pipe has an interior wall comprising two different regions having different affinities for oil and water. The interior wall may also comprise riblet structures oriented in the axial direction of the pipe. The interior wall is applied using several application mechanisms, including, for example, chemical vapor deposition, electroplating, thermal spray, liquid coatings, fusion bonded epoxy coatings, application tapes, roll-on tapes, photolithography, large scale self-assembly, and micro-patterning.

U.S. Pat. No. 5,386,955 discloses a variety of stream-wise riblet projections for drag reduction. In one case, a pattern in the surface consists of various larger-height projections between which are positioned a plurality of smaller-height projections. In another case the projections are arranged in a repeated span-wise pattern in which the adjacent projections in each pattern repeat to different heights.

A series of U.S. Pat. Nos. 7,070,850, 5,848,769, 5,133,516, 5,069,403, 4,986,496 disclose the drag reduction articles. These articles may be either single layer or multi-layers made from various materials in different shapes and sizes. As an application, these drag reduction articles may be adhesively bonded to the surface of an airplane so as to reduce the drag caused by a fluid flowing over the surface.

One important application for riblets is for aircraft wings or rotor blades for aerodynamic drag reduction. U.S. Pat. Nos. 8,413,928, 8,684,310, 8,668,166, and 8,678,316 describe these applications. Metal foils or other materials were processed to obtain riblet textures. U.S. Pat. Nos. 8,444,092 and 9,297,394 discloses metal sheets and plates with riblet textures manufactured by rolling processes. The metal can be aluminum alloy, titanium, or steel. These sheets and plates can be used in fabricating a portion of an aircraft or rotor blade.

U.S. Pat. No. 6,666,646 discloses a method called High Velocity Oxyfuel Process (HVOF) to make a riblet structure on a substrate from a powder. The riblet structure is applied on the gas turbine engine components for aerodynamic drag reduction.

U.S. Pat. No. 8,220,754 discloses a method to create or enhance a riblet structure by using a plasma. The riblet surface may be used to form part of an aircraft.

U.S. Pat. No. 4,907,765 discloses a wall with riblet textures for drag reduction. A photo-lithographic method or laser beam method is used for making such a wall.

U.S. Pat. No. 4,943,476 discloses an application of riblets to the fabrics used on machines in the papermaking industry. In the weaving of paper-making fabrics, fibers were used to form batts which are needled into the structure of fabric bearing a plurality of longitudinal grooves which can enhance their water-removing abilities.

Although riblet-enhanced surfaces may be fabricated using the above techniques, such methods are typically complex or high-cost which may limit their application to high value-added manufactured goods such as airplane wings or turbine blades. Accordingly, there is a need to develop a simplified method to obtain riblet structures, particularly riblet structures on large, difficult-to-reach surfaces such as the interior surface of a pipe.

SUMMARY OF THE INVENTION

In one aspect the present invention provides a method to apply a riblet structure coating on the internal surface of a pipe including coating the internal surface of a pipe with a resin layer and applying a cavity mold having a reverse riblet pattern structure to the coated internal surface of the pipe. A flexible air bag is inserted into the interior of the pipe and charged with air to hold the mold against the coated internal surface of the pipe. The air bag may be charged with air for a sufficient amount of time to allow the coating to cure in the riblet shape of the mold. Afterwards, the air bag and the mold are removed from the pipe to yield a pipe coated with an internal riblet structure.

DETAILED DESCRIPTION

In traditional drain systems the transport capacity for water is limited due to hydraulic resistance; consequently, flooding may sometimes occur in certain areas, particularly during rainy seasons. In order to enhance the transport capacity, the size of the pipeline may be increased, at high cost. A feasible way with cost-effective characteristics is to reduce the hydraulic resistance via applying a riblet structure coating on an internal surface of existing pipelines.

Figure 1:
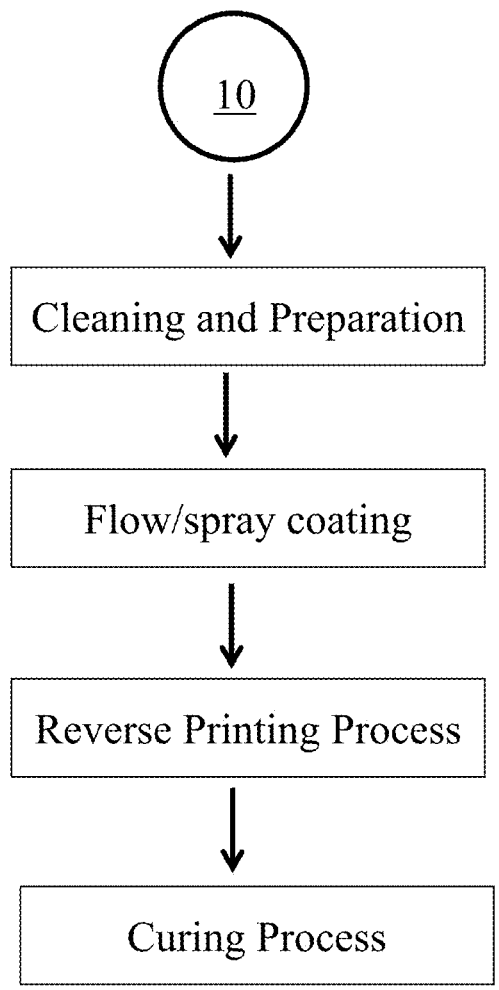
FIG. 1 is a schematic diagram of an exemplary process for applying riblet coating to an internal surface of a pipe.

To apply a riblet structure coating for an internal pipe, a reverse printing process is used. In an embodiment, as illustrated in FIG. 1, a pipe 10 (see also FIG. 4) is selected from various materials (e.g., a concrete, polymer, or steel, iron, or other metal pipes such as drainage pipes) and sizes (e.g., 50 mm in diameter to approximately 1 meter in diameter). In an optional pre-treatment (Step 1), the pipe is cleaned. Typical cleaning procedures include air cleaning by blowing air or chemical cleaning with detergents if oil or grease is coated on the pipe interior. In order to increase the adhesion between the coating and the substrate, a mechanical or chemical polishing process may be carried out before the air blowing.

In Step 2, a liquid resin is flow coated on the internal surface of the pipe to form a smooth coating. Exemplary resins are thermoset or thermoplastic polymer resins such as polyurethane, epoxy resin, fluorocarbon resin, acrylic resin, or phenolic resin. Alternatively, the polymer resin may be applied by other techniques such as spray coating. For pipes that are not yet installed, such as new pipes, the pipe may be inclined at an angle or positioned vertically. Optionally, an uninstalled pipe may be rotated during the flow coating to make the coating more complete and uniform. Unused liquid polymer resin from flow coating can be collected and reused.

Figure 2A:
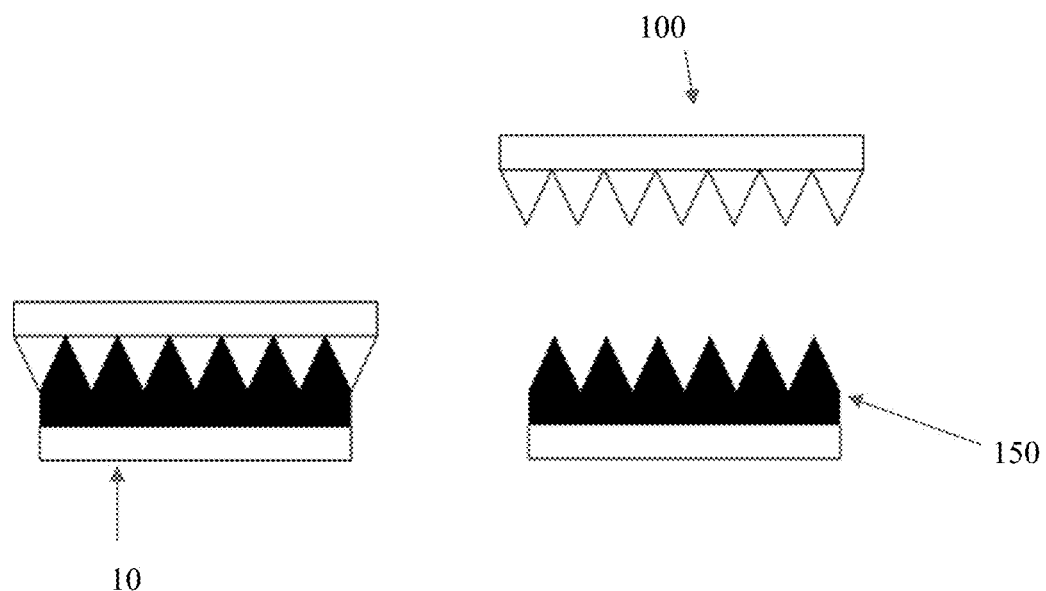
FIG. 2A shows a detached cavity mold with a sawtooth riblet pattern.
Figure 2B:
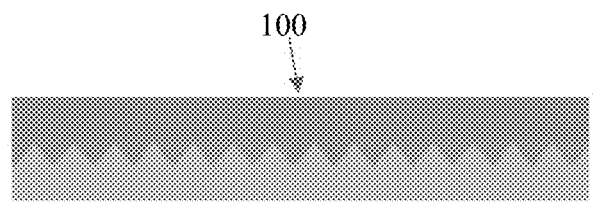
FIGS. 2B, 2C, and 2D show cross-sections of other cavity mold patterns.
Figure 2C:
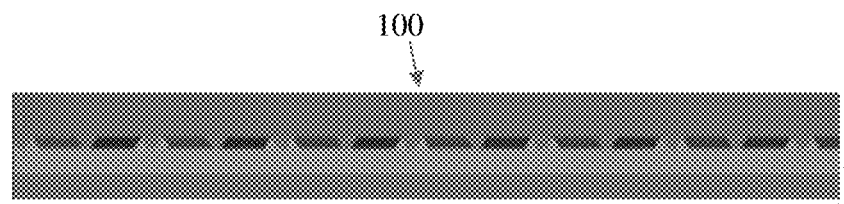
Figure 2D:
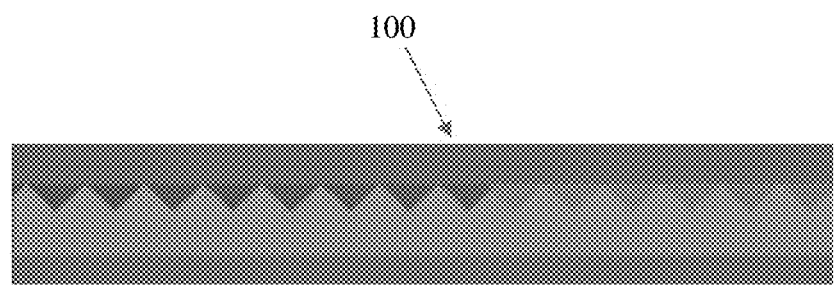
Figure 3A:
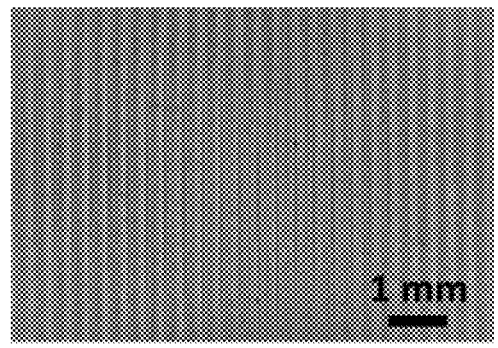
FIGS. 3A and 3B shows optical micrographs of cavity molds with patterns in accordance with an aspect of the present invention.
Figure 3B:
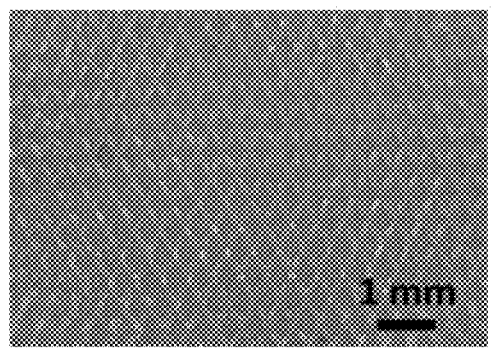
Figure 3C:
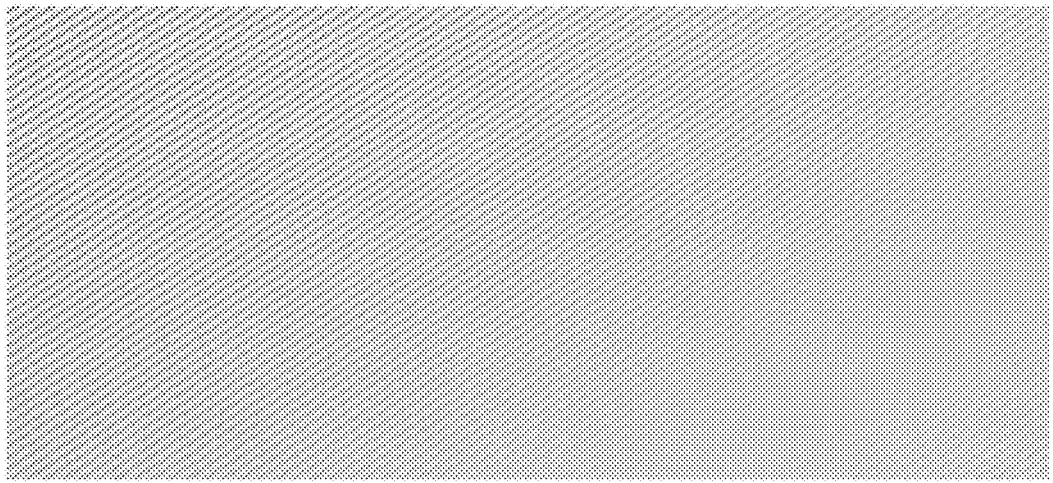
FIGS. 3C and 3D show other patterns in accordance with another aspect of the present invention.
Figure 3D:
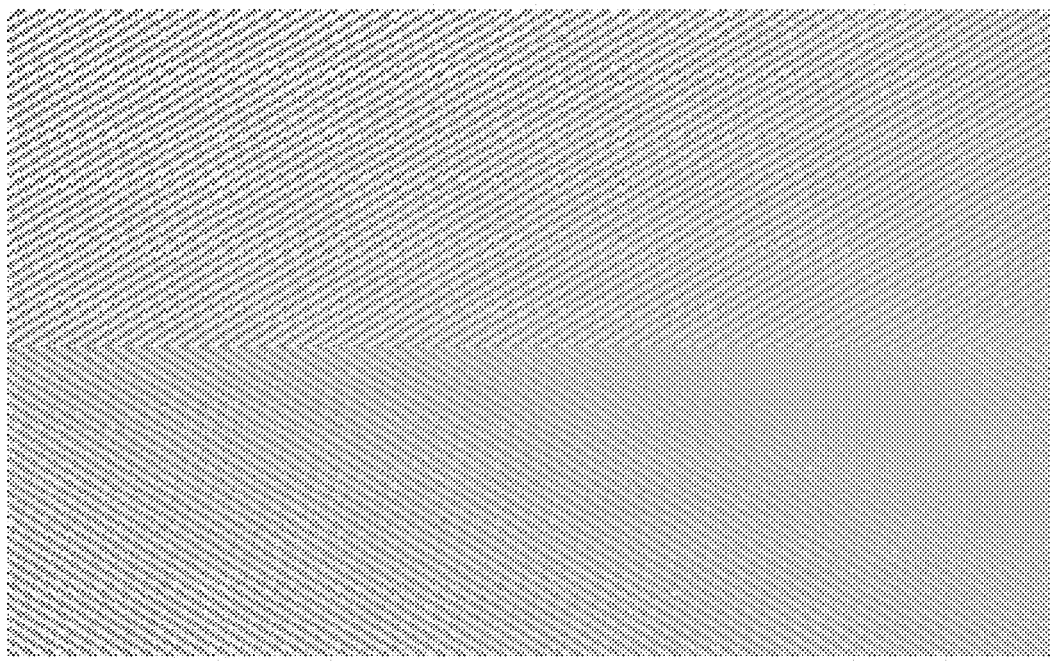
Figure 5:
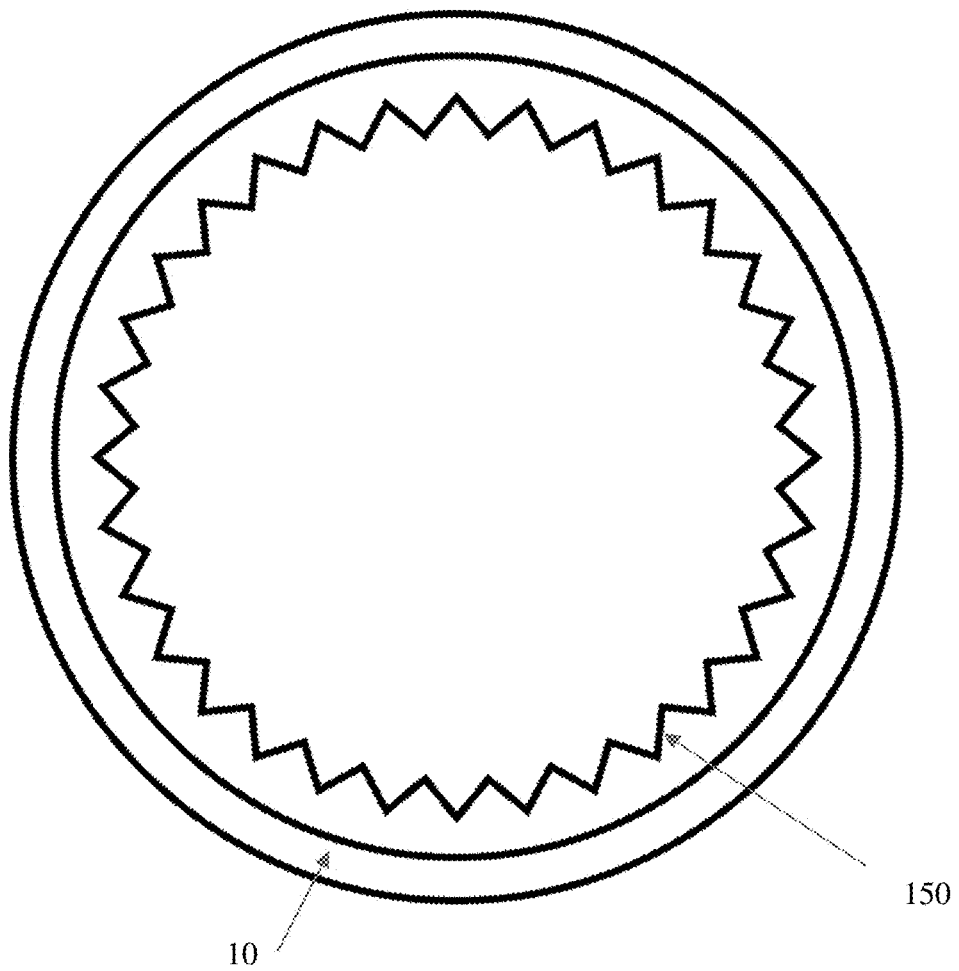
FIG. 5 illustrates a schematic cross-section of pipe with a sawtooth riblet coating in accordance with an aspect of the present invention.

In Step 3, a reverse printing mold is applied. A mold 100 with a reverse riblet structure as a cavity mold is applied to the surface of the coating. The cavity molds in this invention may be composed of various materials and different patterns. For example, poly vinyl chloride (PVC) film with a riblet pattern can be used to form a cavity mold. The pattern is the reverse image of the pattern to be impressed onto the applied polymer film. Exemplary patterns 150 are depicted in FIG. 3. FIG. 3A depicts a simple grooved pattern, FIG. 3B depicts a diamond pattern, FIG. 3C shows a sloping sawtooth pattern, and FIG. 3D shows a symmetric sloping sawtooth pattern. The grooves may have a sawtooth structure as schematically depicted in FIGS. 2 and 5. For example, the sawtooth structure may have a space on the order of 0.3 mm and a height on the order of 0.2 mm. For grooved riblet structures, the grooves run approximately parallel to the direction of flow.

Figure 4A:
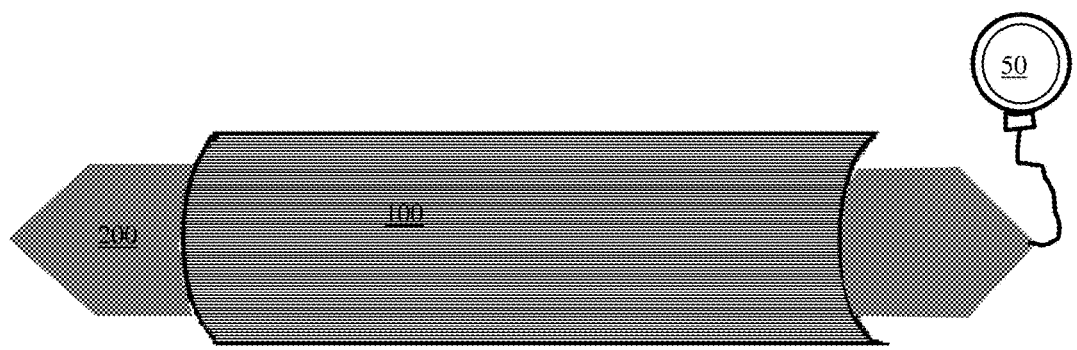
FIG. 4A to 4D schematically depict a circular pipe having a riblet coating applied thereto in accordance with an aspect of the present invention.
Figure 4B:
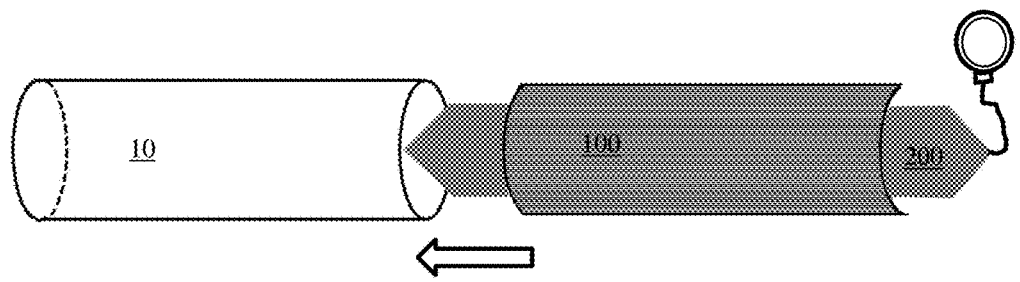

The mold is sufficiently flexible to be able to conform to the interior surface of the structure and is sufficiently rigid to be able to impress the pattern into the coated polymer film. In one embodiment, the mold may be formed as a sleeve to be inserted to a pipe interior. A mold sleeve may be formed by cutting and rolling a suitable mold film. FIG. 4A depicts a mold 100 being wrapped around an air bag 200 interior to the mold 100.

Figure 4C:
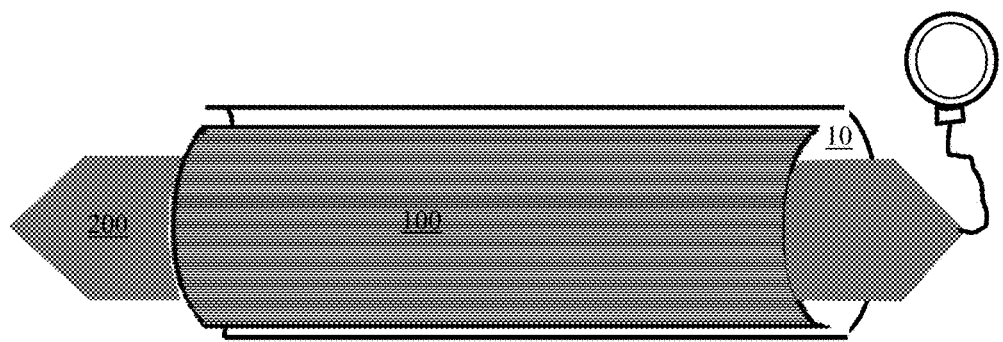

In step 3 an air bag 200 (FIG. 4B) is applied to the interior of the pipe 10. In an exemplary embodiment, the air bag 200 may be inserted concentrically interior to a mold sleeve and both the air bag and the mold sleeve inserted into the interior of the pipe 10. In one aspect, the mold 100 may be formed as a sleeve by wrapping a mold film around the air bag 200. As the air bag 200 is inflated by an air pump 50, the mold sleeve 100 is pressed into the surface of the coating. Any device that is able to inflate the air bag 200 may be used as the air pump 50. Thus, the air bag, when inflated, has a diameter at least approximately equal to the interior diameter of pipe 10 as depicted in FIG. 4C. Typically, an elastomeric material such as rubber may be used for the air bag 200 which is formed into an approximately cylindrical shape when used for coating the inside of a circular cross-section pipe. By using an elastomeric material, the diameter of the air bag may sufficiently expand to impress the mold 100 against the coating, 150. Typically, either the air bag or the sleeve-shaped mold longer than the pipe by approximately 5 cm for complete molding of the whole internal surface of the pipe. Since there is a load impressed from the reverse side of the mold, any air between the mold and the coating is removed. During the curing of the coating into the shape of the mold, the coating and mold maintain a tight fit. Therefore, the pattern of the female mold is "reversed printed" onto the surface of the coating.

Figure 4D:
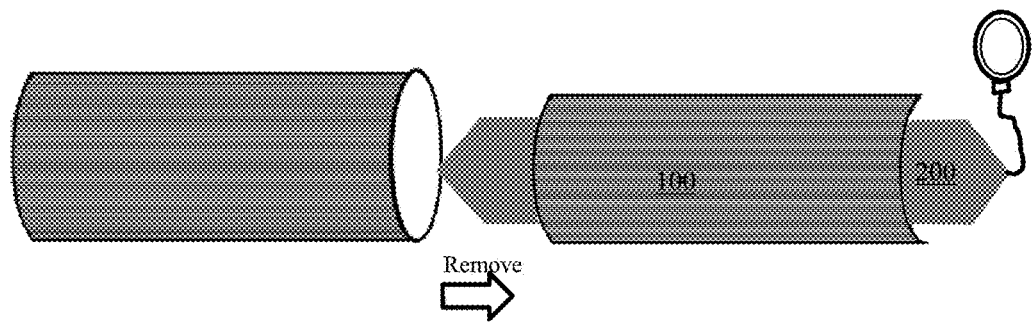

In Step 4, the air bag is maintained in an inflated state until sufficient curing of the coating, that is, until the coating maintains its shape when the mold is removed. For typical polymeric resins, this period of time is on the order of 12 hours but varies depending on the selected coating material, the thickness of the coating, and the dimensions of the riblets formed by the coating. Following molding, the air bag and the mold are removed from the pipe as seen in FIG. 4D and a pipe with an internal riblet structure coating is obtained as depicted in FIGS. 2A and 5. FIG. 2A schematically depicts a cross-sectional close-up of a molded film 150 on pipe 10 made by mold 100. FIG. 2A depicts a sawtooth pattern; FIG. 2B depicts a sloping sawtooth pattern, FIG. 2C depicts a diamond pattern, while FIG. 2D depicts a symmetric sloping sawtooth pattern. Patterns may be selected depending upon the desired flow-enhancing properties. It is noted that no demolding agent is needed due to the incompatibility between the mold and the coating materials.

Figure 6:
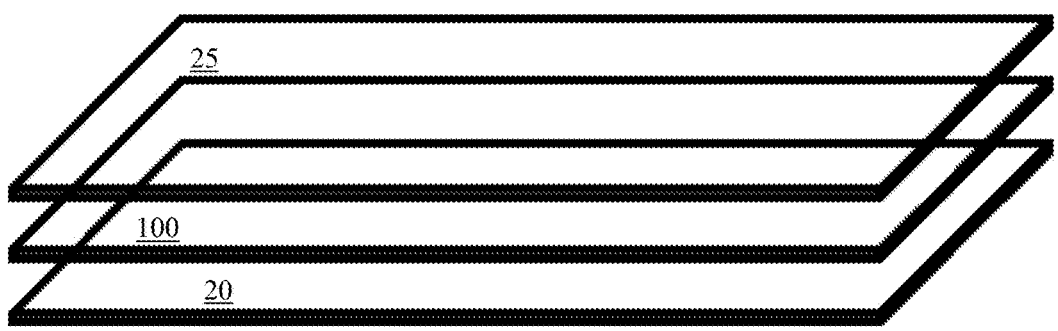
FIG. 6 depicts the fabrication method of a riblet coating on a flat substrate in accordance with an aspect of the present invention.

In other aspects, the present invention may be applied to substrates of other shapes. FIG. 6 depicts the production of the riblet coating on a flat substrate 20 in accordance with the present invention. In this case, a flat female mold film 100 is used for a reverse printing process. A flat load plate 25 may be used to apply pressure to impress the mold into the coating. The substrate 20 can be horizontal, vertical, or inclined as long as the coating may be applied on the substrate. The flat substrate 20 is representative of the bottom or side surface of an open channel for drain lines. Therefore, this reversed printing process can be applied to the channels of this type.

Figure 7:
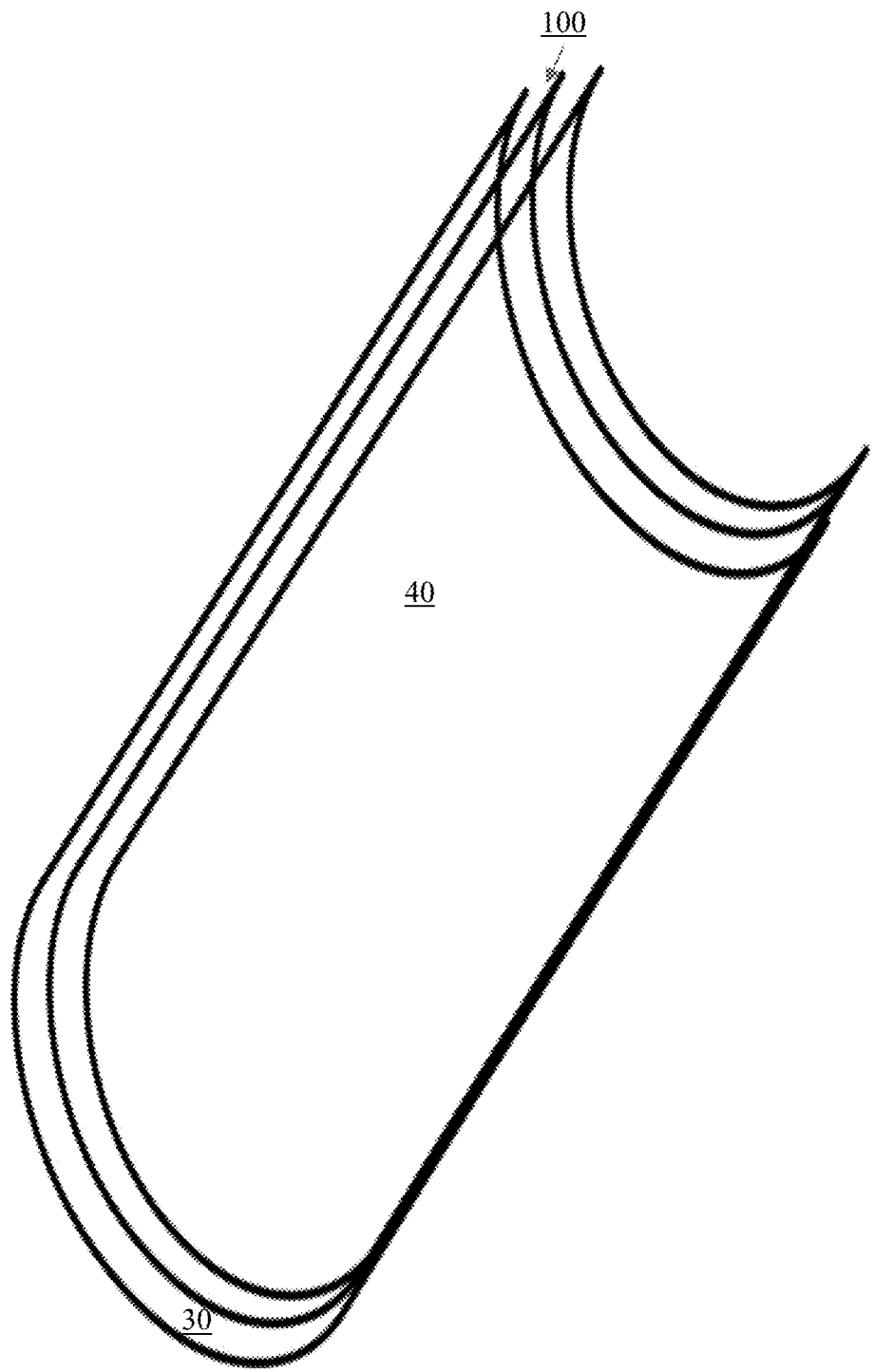
FIG. 7 displays the fabrication method of a riblet coating on a curved substrate in accordance with an aspect of the present invention

FIG. 7 depicts the production of the riblet coating on a curved substrate 30 in accordance with the present invention. Because the female mold film 100 is flexible, it can be attached to the coating on the curved surface of the substrate. In this case a load 40 with a matched shape of the curved substrate is used to give pressure onto the mold and coating. The curved substrate is a representative of an open drain channel. Therefore, the reverse printing process can be applied to an existing channel of a semicircle or other curved shapes.

Advantageously, the method of the present invention can impart various riblet patterns to coated surfaces. This method is cost-effective since it is unnecessary to rebuild pipelines in drain systems to enhance the transport capacity of water. Further, no expensive specialized equipment is needed. The air bag and the cavity mold can be used repeatedly. Compared to methods in which adhesive riblet tape or foil is applied to the surface of a substrate, the adhesion between the riblet structure coating and the substrate is stronger in the present invention.

The methods of the present invention may be applied to cured-in-place pipe (CIPP), a technique for repairing existing cracked, broken and failed pipes such as sewer, gas, water and chemical pipelines. CIPP liners are generally constructed of a tubular layer(s) of non-woven polymer felt with an exterior resin coating. A calculated amount of catalyzed thermosetting resin mixture is impregnated into the felt during a process called wet-out. The felt acts as both a resin carrier and adds flexible strength to the finished liner. Upon completion of the wet-out, the CIPP liner is transported to the installation site. At the installation site, the CIPP liner is positioned within the host pipe either by inversion (air or water) or winched into place. Once in position, the CIPP liner is inflated by air pressure or by a water column to press the material against the host pipe wall. After cured in place promoted by hot water, UV light or just under ambient condition, the resin may form a tight-fitting, jointless and corrosion-resistant replacement pipe. Using the present invention, riblet structures may be formed on the interior surface of the liner to decrease the drag from fluids passing through the pipe.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the specification, and following claims.

The invention claimed is:

1. A method of applying a riblet structure coating on an internal surface of a pipe comprising:
   coating the internal surface of a pipe with a resin layer;
   applying a cavity mold having a reverse riblet pattern structure to the coated internal surface of the pipe;
   inserting a flexible air bag into the interior of the pipe;
   charging the air bag with air to hold the mold against the coated internal surface of the pipe; and
   removing the air bag and the mold from the pipe to yield a pipe coated with an internal riblet structure.

2. The method of claim 1 further comprising cleaning of the pipe as a pre-treatment.

3. The method of claim 1 wherein the coating comprises flow coating on the interior surface of the pipe.

4. The method of claim 1 wherein the coating comprises spray coating on the interior surface of the pipe.

5. The method of claim 1 wherein the resin is a polymer resin selected from polyurethane, epoxy resin, fluorocarbon resin, acrylic resin, or phenolic resin.

6. The method of claim 1 wherein the riblet structure is a grooved riblet structure.

7. The method of claim 6 wherein the grooved riblet structure is formed parallel to a direction of water flow in the pipe.

8. The method of claim 1 wherein the mold is formed around the airbag.

9. The method of claim 8 wherein the mold formed around the airbag is inserted into the coated pipe.

10. The method of claim 1 wherein the pipe is a drain pipe.

11. The method of claim 1 wherein the riblet pattern is selected from sawtooth, sloping sawtooth, diamond, or symmetric slowing sawtooth patterns.

12. The method of claim 1 wherein the pipe includes a cured-in-place liner and the riblet pattern structure is formed on the interior surface of the cured-in-place liner.

13. The method of claim 12 wherein the riblet pattern structure is selected from sawtooth, sloping sawtooth, diamond, or symmetric sloping sawtooth patterns.

* * * * *